United States Patent
Schutt

[11] Patent Number: 5,551,325
[45] Date of Patent: Sep. 3, 1996

[54] TIRE CUTTING MACHINE

[76] Inventor: Donald Schutt, 1520 Waukazoo Dr., Holland, Mich. 49424

[21] Appl. No.: 322,762

[22] Filed: Oct. 13, 1994

[51] Int. Cl.⁶ .............................. B26D 1/09; B26D 5/22; B26D 7/02

[52] U.S. Cl. .................. 83/133; 83/176; 83/226; 83/951; 241/279; 241/DIG. 31; 157/14

[58] Field of Search ............................. 83/175, 176, 951, 83/923, 133, 226; 241/DIG. 31, 279, 270, 272; 157/20, 13, 14

[56] References Cited

U.S. PATENT DOCUMENTS

| | | | |
|---|---|---|---|
| 1,329,849 | 2/1920 | Pierson | 157/20 |
| 1,622,440 | 3/1927 | Gammeter | 157/13 |
| 2,323,975 | 7/1943 | Campbell | 83/176 |
| 2,783,830 | 3/1957 | Pozerycki et al. | 157/14 |
| 3,830,120 | 8/1974 | Peterson . | |
| 4,338,839 | 7/1982 | Farrell, Sr. et al. . | |
| 4,338,840 | 7/1982 | Farrell, Sr. et al. . | |
| 4,805,507 | 2/1989 | Schmidt et al. . | |
| 4,852,812 | 8/1989 | Penner | 241/279 |
| 4,967,626 | 11/1990 | Doster et al. | 83/176 |
| 5,054,351 | 10/1991 | Joliffe et al. | 83/951 |
| 5,094,905 | 3/1992 | Murray . | |
| 5,133,236 | 7/1992 | Dudley . | |
| 5,267,496 | 12/1993 | Roach et al. . | |

FOREIGN PATENT DOCUMENTS

| | | | |
|---|---|---|---|
| 2531923 | 2/1977 | Germany | 83/175 |
| 2939849 | 4/1981 | Germany | 83/951 |

Primary Examiner—Kenneth E. Peterson
Assistant Examiner—Charles Goodman
Attorney, Agent, or Firm—Dowell & Dowell

[57] ABSTRACT

A machine for cutting used tires into selectively sized pieces or segments which includes a cutter which is movable relative to a die against which a tire is supported. An indexing mechanism is engaged with the tire to rotate the tire relative to the die after each successive cutting motion of the cutter so that contiguous and/or adjacent segments or portions of the tire are progressively severed from the middle reinforced inner bead of the tire.

19 Claims, 11 Drawing Sheets

TIRE CUTTING MACHINE

BACKGROUND OF THE INVENTION

1. Field of the Invention

This invention is generally directed to cutting devices and more particularly to a reciprocally operated cutter for reducing used tires to selected sizes of segments or pieces wherein the tires being processed are continuously indexed with respect to the cutter.

2. History of the Related Art

As concerns over protecting and preserving the environmental are continuously increasing, there is an urgent need to find alternate uses for waste products and for the recycling of raw materials. Governmental regulations no longer permit the disposal of many used or waste articles of manufacture in conventional landfills. This is especially due to the hazardous and potentially toxic conditions which can be created by the disposal of certain materials.

One of the greatest environmental concerns is directly related to the disposal of waste or used automobile, truck and related vehicle tires. Due to the environmental risks associated with storage of used tires, various countries have enacted regulations which strictly control the disposal of tires and regulate the manner in which tires may be stored and the number of tires which may be stored in any given location.

In the United States, most used tires which are collected are shipped from retailers, such as service stations and tire outlets, to centralized processing or storage sites. The problems associated with the handling and disposal of used tires to retailers is considerable. Due to the enormous cost of handling and disposing of used tires, most retailers now charge consumers handling and disposal fees for shipping and disposing of worn or damaged tires which are traded as new tires are purchased.

In view of the foregoing, it has become imperative that new methods be created not only for transporting discarded, used and damaged tires, but for processing such tires for potential alternative uses. In recent years, there have been many developments in recycling or reclaiming portions of old or discarded tires. In some instances the rubber material is heated and reduced to extract oil or fuel elements. In other instances, tires are crushed and shredded and the shredded material is utilized as a filler in asphalts and cements. Further, uses for shredded tires have been found in other industries to form building panels, insulation, and related products.

There remains however, the initial problem of material handling and the costs associated with transporting tires to processing and/or storage sites. Most retailers continue to haul used tires as they are received to processing or collection sites. The load volume of used tires is appreciable and the handling and shipping of such items consumes costly labor hours.

To reduce used tires to small pieces or segments to facilitate both the shipment and storage for future processing, numerous machines have been developed for cutting and shredding tires. Many such machines are designed for bulk reduction of great numbers of tires which are received from various sources such as commercial retailers. These machines are very large and designed to operate at central and fixed locations. Some examples of these types of machines are disclosed in U.S. Pat. Nos. 4,338,839, 4,338,840, 4,374,573, 5,094,905, and 5,267,496. Unfortunately, these types of machines are too large, too complex, and not economical for use in conventional retail service centers and tire outlets.

In an effort to provide cutting machines which can be utilized in smaller retail establishments, there have been a number of innovations made with respect to machines for severing tires into segments to facilitate storage and shipment. In U.S. Pat. No. 4,805,507 to Schmidt et al., tire cutters are disclosed which utilize a shearing blade which is pivoted between a pair of anvil blades in order to sever vehicle tires into segments. In U.S. Pat. No. 5,133,236 to Dudley, a portable tire cutter tool is disclosed which has a pivotable blade which is movable relative to a split anvil so that, as the blade pivots between the spaced edges of the anvil, the tire is severed. In both of these inventions, however, it is necessary for an individual to manually rotate the tire relative to the cutting blade. This is extremely hazardous as an individual must be working closely to a powered and moving blade. Further, if the blade is deactivated as the tire is manually rotated, the amount of time necessary to completely sever a tire into sufficiently small segments is too great and the whole process too costly in terms of man hours necessary to reduce a tire to the desired segments.

An additional reference which is utilized to cut and split tires and which indexes the tires relative to a slicing device is disclosed in the U.S. Pat. No. 3,830,120.

In view of the foregoing, there remains a need to provide machinery which can be utilized by individual retailers and small commercial establishments to reduce old and worn tires into small segments for storage, handling and shipment to facilitate the recycling and processing of these materials. Further, there remains a need to provide a machine which can be utilized safely to decrease the cost associated with the handling, shipping, disposal, and recycling of waste automotive and other vehicle tires.

SUMMARY OF THE INVENTION

This invention is directed to a tire cutting machine which includes a cutter having replaceable blade portions which are mounted for reciprocal motion to a powered ram or piston which, in the preferred embodiment, is controlled by a pneumatic or hydraulic cylinder. The cutter is mounted to a slide block which is sideably disposed on a central guide which extends generally along the length of the machine and which has a forward end on which an open anvil or die is mounted. The anvil or die is configured having edge portions which work cooperatively with the edges of the cutter to sever segments of tire therebetween as the cutter is moved into one or more openings of the die during each stroke of the piston or ram member.

The machine further includes an indexing mechanism which is engageable with a tire that is supported on the guide between the cutter and the die. In the preferred embodiment, the index mechanism includes a pair of space indexing wheels which are engageable on opposing sides of the tire adjacent the inner bead at which the tire is normally reinforced by metal cords. One of the indexing wheels is rotatably advanced in periodic sequence so as to rotate the tire against the opposing wheel and thereby advance a new segment of a tire into aligned relationship with the cutting die. The indexing mechanism may be controlled by an elongated indexing rod which is carried by the slide block to which the cutter is mounted. The bar or rod includes a plurality of spaced teeth which are engageable with the teeth of a drive wheel which is mounted adjacent the cutting die. The drive wheel is clutched so as to disengage relative to the driven indexing wheel when the cutter is moving in a cutting direction toward the cutter die, however, is ratcheted into engagement with the driven indexing wheel as the cutter is retracted relative to the cutting die to thereby accurately advance a new segment of tire into alignment with the cutting die. In one embodiment, the degree to which a tire is indexed is controlled by adjusting the stroke of the indexing bar so that the indexing drive wheel rotates to a greater or lesser degree as the cutter is retracted relative to the cutting die.

In the preferred embodiment, the invention further includes a housing or cage which surrounds the cutter, the cutting die, and the ram or piston assembly so that individuals cannot be exposed to the cutter blade during the operation of the machine. A portion of the housing is pivotable to allow access to mount a tire to the machine. The moveable portion is thereafter returned to enclose the tire during the cutting cycle. A safety switch may be provided so that, when the housing is opened to place a tire on the machine, the ram assembly is deactivated and will only be activated upon closure of the housing about the tire.

In an alternate embodiment, the cutter and cutting die may include a plurality of punches and die openings. The punches may include stripper elements for engaging the tire adjacent the plug of material which are being severed as the punches enter into aligned die openings during the operation of the machine.

It is the primary object of the present invention to provide an economical, compact, and safe machine which may be utilized by tire retailers, gasoline and related service stations and the like to cut used tires into segments or pieces to facilitate the handling and shipment of such materials.

It is also an object of the present invention to provide a tire cutting machine which allows tires to be cut into selected sizes of pieces or segments for disposal or shipment and wherein the machine continuously indexes a tire until the entire tire is cut or processed into small or segments or pieces.

It is the further object of the present invention to provide a tire cutting machine which utilizes a reciprocal cutter movable relative to a fixed die wherein both the cuter and the die may be easily changed to create differently shaped segments or pieces.

It is another object of the present invention to provide a small and economical tire cutting machine which may be utilized safely and automatically without the need for manual indexing of tires relative to the cutting elements of the machine.

DESCRIPTION OF THE PREFERRED EMBODIMENT

With continued reference to the drawing figures, the cutting machine 20 of the present invention includes a support stand or base 21 having a plurality of legs 22. The stand has an upper generally narrow support platform 23 having an outwardly extending cantilevered portion 23' which is horizontally oriented in front of the stand 21. A first pair of vertically oriented and spaced opposing bracket members 24 are secured to the platform 23 adjacent the back end of the machine and a second pair of vertically oriented and spaced opposing brackets members 25 are mounted to the platform 23 adjacent the forward end thereof. A guide beam 26 is mounted so as to be spaced above the platform 23 of the stand 21 and includes an innermost end portion which is mounted to and between the bracket members 24 and an outermost end portion which is mounted to and between the outer brackets 25. It should be noted that although the guide beam shown in the drawings has a rectangular cross-sectional configuration, guide beams having different cross-sectional configurations as well as one or more guide rods, and the like, could also be utilized and be within the teachings of the present invention.

Mounted about the guide beam 26 is a slide block assembly 28 having an upstanding portion 29 to which a bracket 30 is mounted. The configuration of the slide block may be changed, as desired, and is shown in one configuration in FIGS. 1–4 and in another configuration in FIG. 16. The slide block assembly 28 is shiftable horizontally along the length of the guide beam 26 by way of a power means such as a ram assembly 32. In the preferred embodiment, the ram assembly includes a hydraulic cylinder 33 and piston rod 34. Hydraulic fluid is supplied by way of motor and pump assembly 35 from a hydraulic fluid supply tank 36 to the cylinder 33 by way of hydraulic lines 37 and 38 which are connected to an appropriate diverter valve assembly 40. The closed end of the hydraulic cylinder 33 is pivotably mounted to the bracket members 24 by a pivot pin 41 which is connected to a secondary bracket member 42 connected to the cylinder. The piston rod 34 includes a secondary bracket member 43 on the outer end thereof which is pivotably connected at 44 to the bracket 30 extending from the upstanding portion 29 of the slide block assembly 28.

Figure 1:
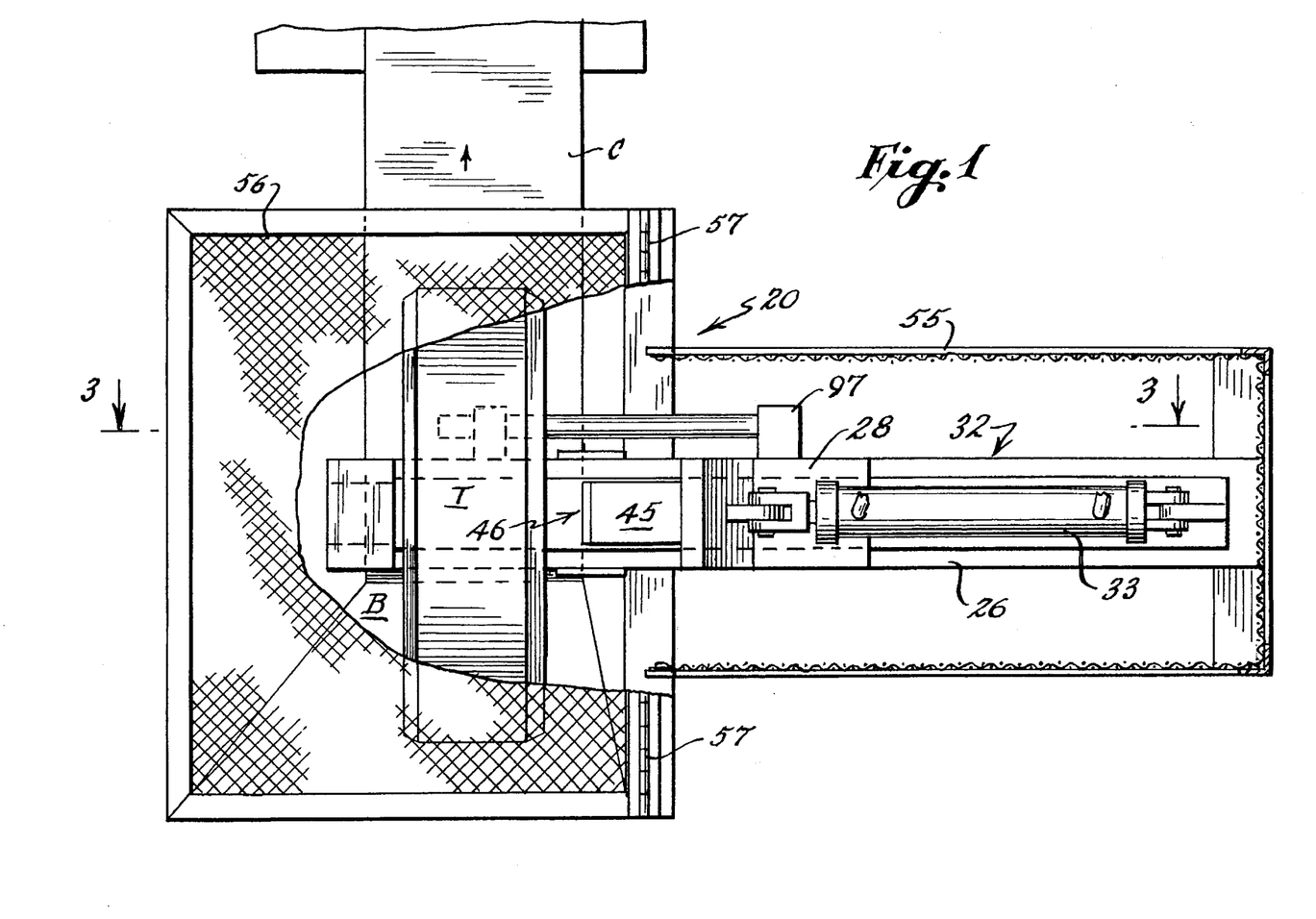
FIG. 1 is a top plan view of the cutting machine of the present invention having portions broken away to show the mounting of a tire between a cutter and a cutting anvil or die.
Figure 2:
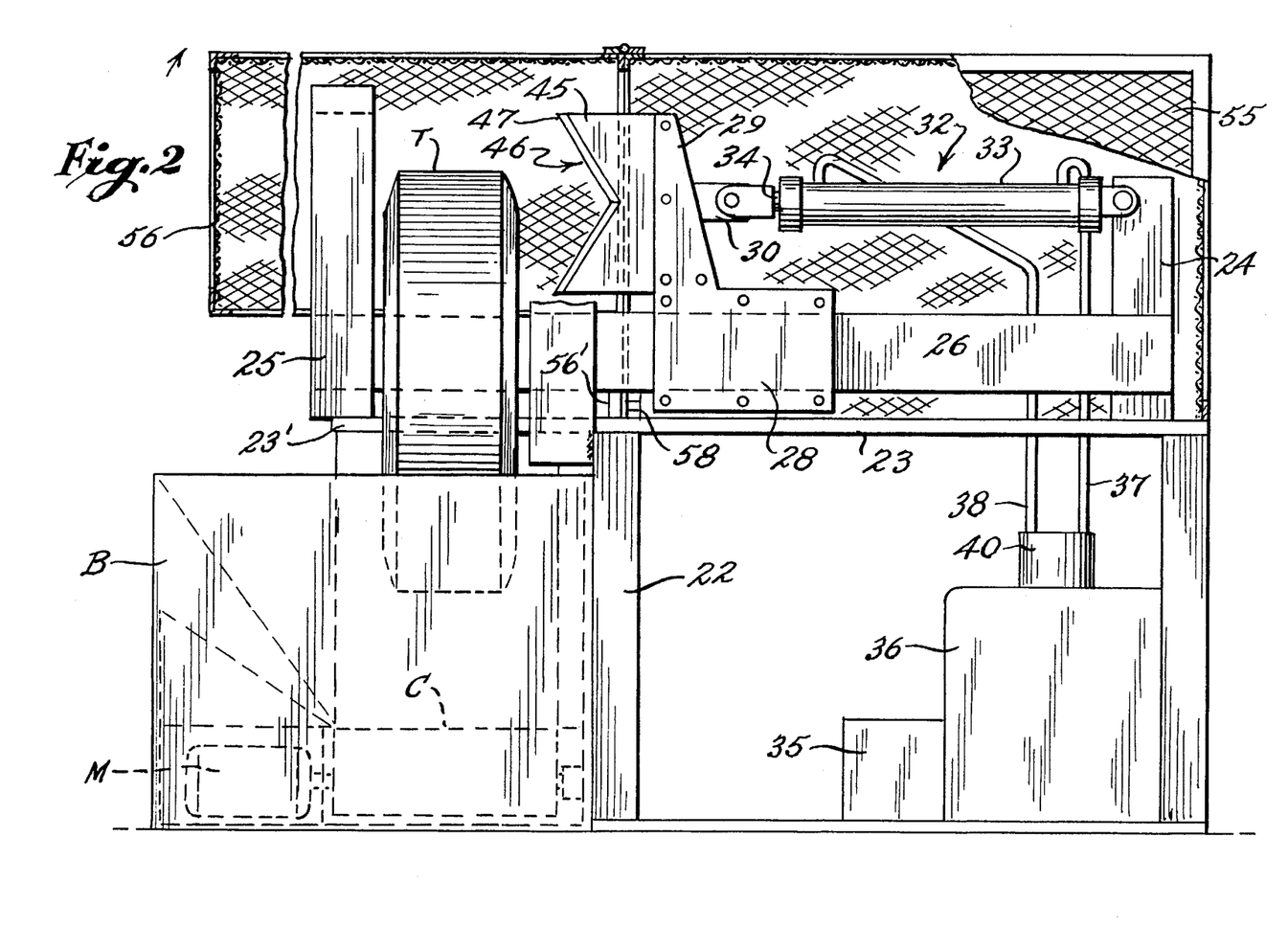
FIG. 2 is a left side view of the cutting machine of FIG. 1.
Figure 3:
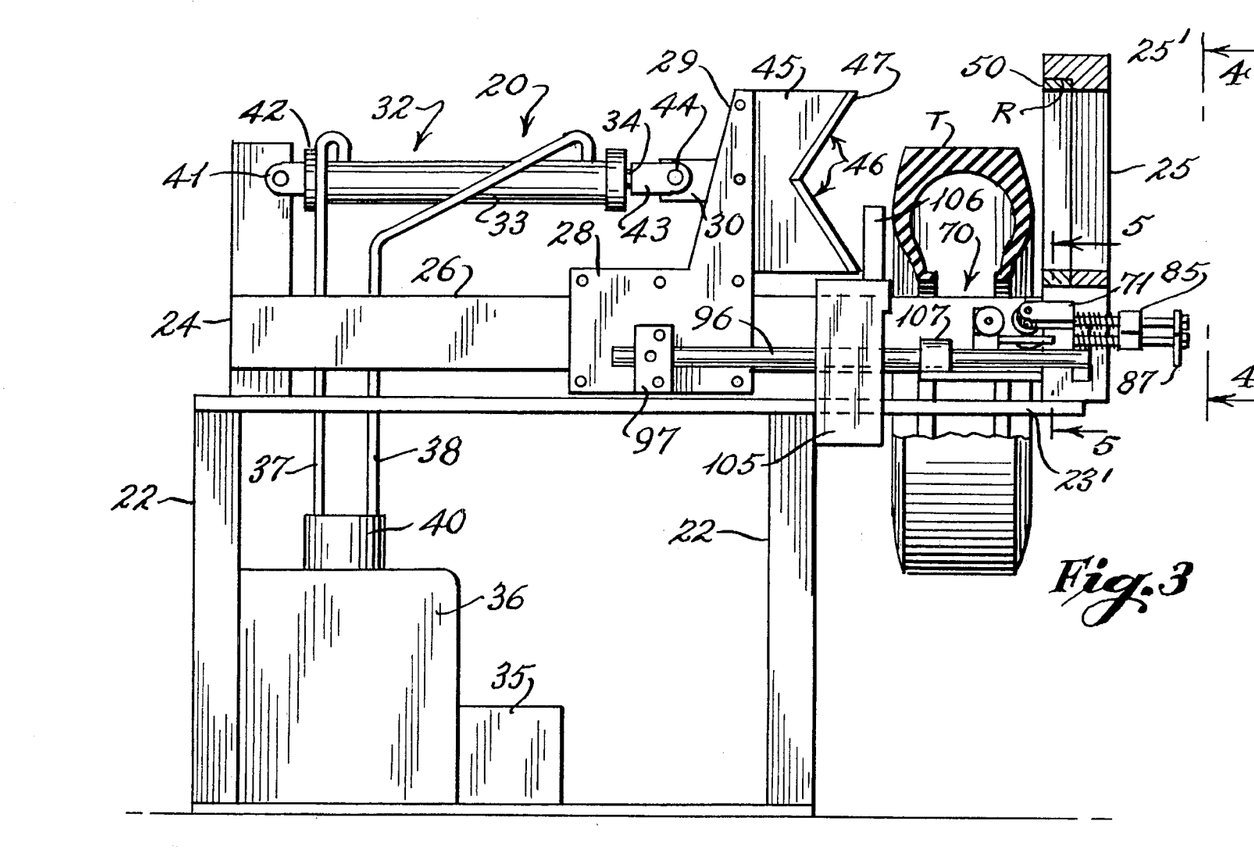
FIG. 3 is a right side view of the cutting machine of FIG. 1 with the housing removed and showing a tire having portions cut therefrom mounted between the cutter and cutting die.

As shown in FIGS. 2 and 3, a cutter support block 45 is mounted to the forward face of the upstanding portion 29 of the slide block and is shown in the drawings figures as being generally "V"-shaped in configuration. The block is generally aligned with the central axis of the piston rod 44. Mounted by bolts 49, see FIG. 12, or otherwise secured, along the "V"-shaped face of the block 45 are a pair of cutter plates 46. The cutter plates are generally sharpened on their opposing side edges 47 and along at least the lower forward edge 48. In some instances both the upper and lower edges 48 may be sharpened.

Although a "V"-shaped cutter configuration is shown in drawing FIGS. 2 and 3, different configurations of cutter support block 45 and cutting plates 46 may be utilized and be within the teachings of the present invention. One feature of the present invention is that the cutters 46 may be easily removed to be replaced and/or sharpened. In addition, the cutter configuration may easily be changed by either changing the cutter plates or by changing the cutter support block 45 as well as the cutter plates 46.

The forward bracket elements 25 are joined on their upper edges by a cross member 25'. The bracket members define a generally rectangular opening into which a generally rectangularly configured cutting die 50 is mounted. It should be noted that the bracket members and the connecting beam may be recessed, as is shown at "R", so that the cutting die 50 is generally flush with the opening defined by the bracket members. The opposing inside edges associated with the die 50 provide cutting surfaces which cooperate with the surfaces 47 and 48 associated with the cutter plates 46. In this manner, the cutter plates are of a size to be slidably received with respect to the inner surface of the cutting die 50 to thereby sever any material which may be trapped between the edges of the cutter plates and the cutter die. Although, not specifically shown in the drawing figures, the cutter die 50 may also be removably mounted from between the bracket members 25 to facilitate changing dies for maintenance or for purposes of changing die configurations to correspond and cooperate with the configuration of any selected cutter element(s).

Figure 8:
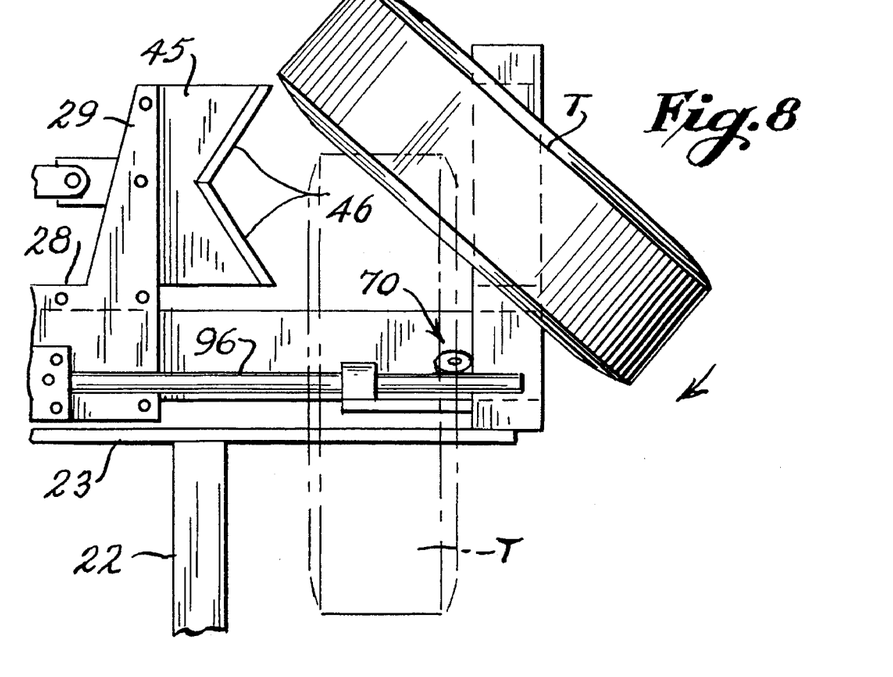
FIG. 8 is a partial perspective view showing the manner in which a tire is mounted over the die of the present invention prior to cutting.
Figure 9:
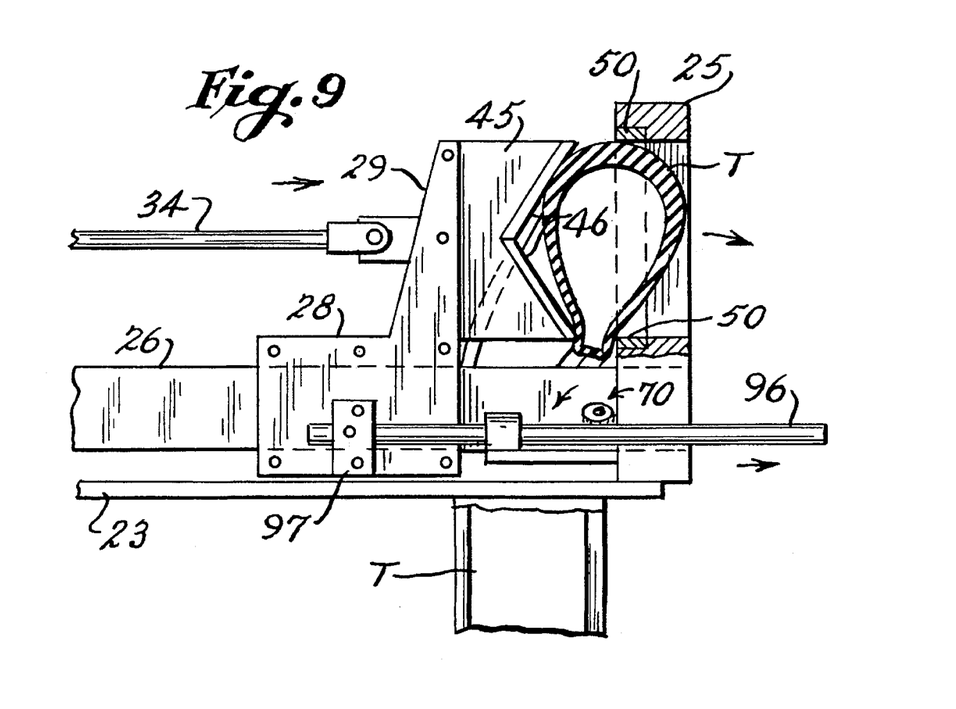
FIGS. 9, 10, and 11 are partial illustrational views showing in consecutive steps the manner in which the cutter cooperates with the cutting die to sever segments of tire during the use of the machine of the present invention.
Figure 10:
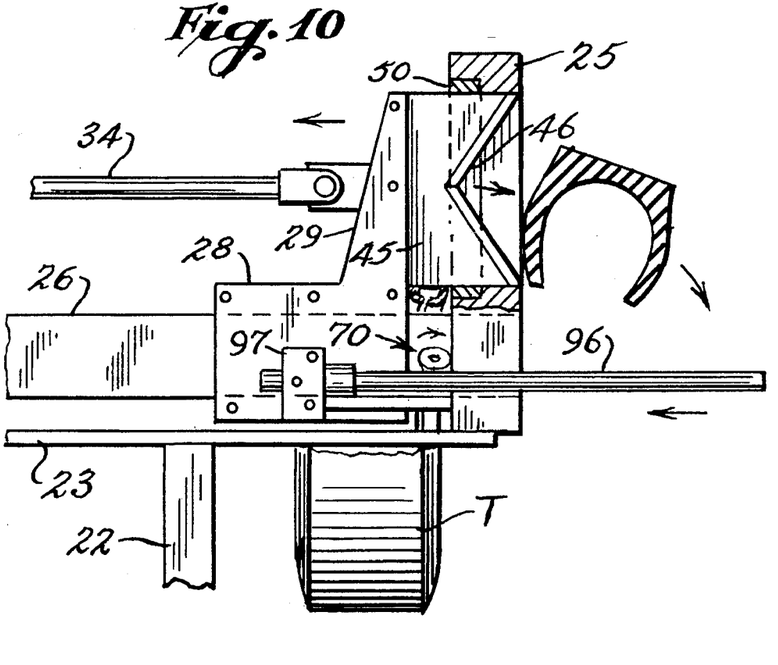
Figure 11:
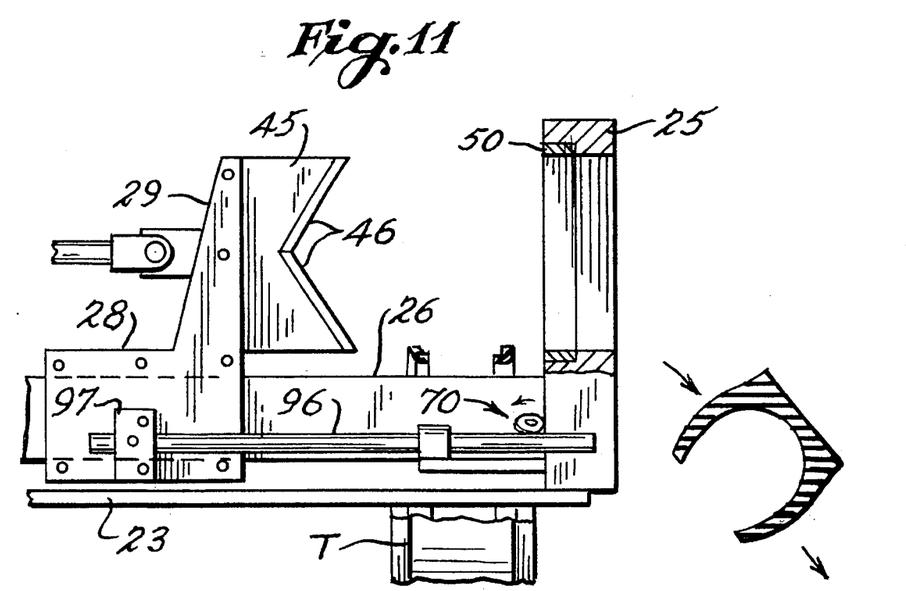

The cooperative relationship between the cutters and the cutting dies of the present invention is best shown in FIGS. 8-11 in which there is illustrated the manner in which a segment of a tire is severed during the use of the cutting machine. As shown in FIG. 8, the tire is inserted over the bracket members 25 and die 50 and over the outer end of the guide beam 26 and is rested in the dotted line position shown in FIG. 8 adjacent to the inner face of the die while being supported by the beam. As shown in FIG. 9, the inner beaded and reinforced edges of the tire is seated on the guide beam 26 so that the sidewall portion immediately above the beaded edge is in general alignment with the lower edge of the die opening and with the lower cutting edge of the cutter. As the cutter moves in the direction of the arrow shown in FIG. 9, a generally U-shaped segment of tire is severed between the edges of the cutter and the edges of the die opening. Thereafter, as the cutter moves forward the tire segment is pushed from the die, as shown in FIG. 10. The cutter head is then withdrawn by appropriate activation of the ram assembly 32.

After segments have been cut from the tire, the segments fall into a bin "B" positioned beneath the die and are conveyed by a conveyor "C" to an awaiting receptacle. The conveyor is powered by a motor "M".

To ensure the safety of individuals working with the tire cutting machine of the present invention, the machine is covered over the stand portion with a first housing section 55 which is shown in the drawings as being formed with a metallic frame which is secured to the stand and which extends over the ram assembly 32. The housing may be formed of a wire mesh material. Hingedly connected to the forward portion of the housing 55 is a cantilevered housing section 56. The housing section 56 is connected by a hinge 57 to housing section 55 and is pivotable in an upward direction as shown by the arrow in FIG. 2 in order to allow access to the area of the die so that tires may be placed into cutting position on the machine. As shown in top plan view in FIG. 1, the cantilevered portion of the housing is somewhat wider so as to accommodate tires of different diameters.

Figure 14:
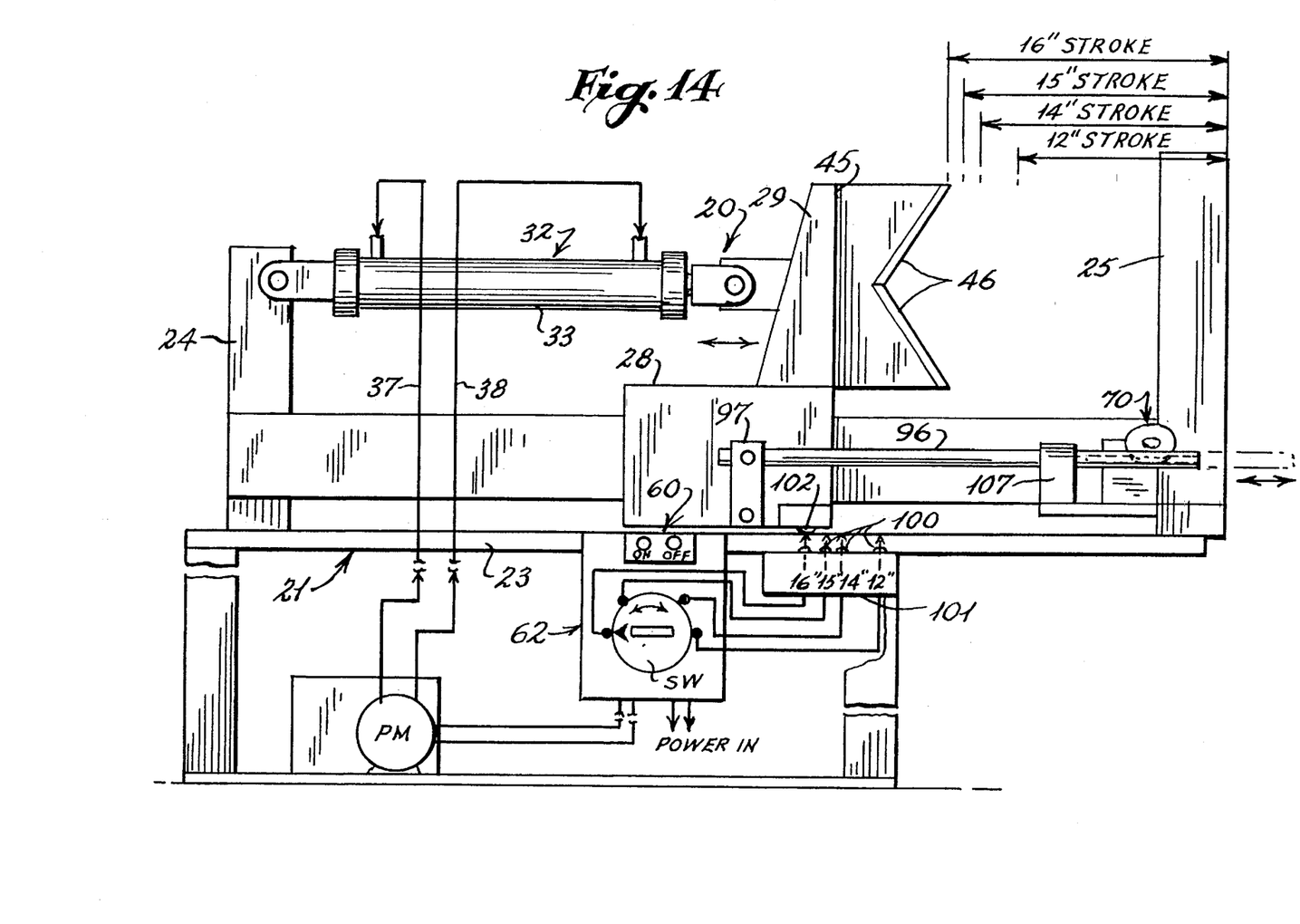
FIG. 14 is a right side view of the machine of the present invention showing one means for electronically controlling the indexing mechanism of the present invention.

As a safety feature, a normally open relay switch 58 is mounted to the framework of the housing section 55 and includes a plunger element which is engageable with the rear framework portion 56' of the cantilevered housing 56. In this manner, whenever the housing 56 is raised, the relay switch 58 automatically opens thereby opening the electrical circuit to an on/off switch 60, as shown in FIG. 14, thereby preventing operation of the machine. When the cantilevered housing portion is again closed, the switch 58 is closed to complete the electrical circuit which will enable the operation of the machine in response to the on/off switch 60.

With continued reference to FIG. 14, the cutting machine of the present invention includes a control board 62 which includes the on/off switch 60 and which further includes an adjustable timing circuit (not shown) for controlling the motor 35 to supply hydraulic fluid to the ram assembly 32 so that the piston rod 34 is cycled in forward and reverse directions a specific number of times depending upon the size of tire which is mounted forwardly of the cutting die. In this manner, the cutter will be advanced into cutting relationship with respect to the cutting die a selected number of times depending upon the size of the tire so that, once a cycle is initiated, an operator no longer has to stand by the machine until the complete tire has been severed into the desired pieces.

Further, and by way of example, if the width of the die is set for cutting 4" segments of tire, the ram assembly must be operated a given number of strokes in order to allow the complete circumferential dimension of the tire to be cut. The invention includes an indexing mechanism, as will be discussed hereinbelow, for automatically advancing a tire a given number of degrees after each stroke of the ram assembly. If it is desired to reduce the size of the cut segments to 2", the ram assembly must be operated an additional number of times to complete the processing of the tire into the 2" segments. By proper adjustment of the adjustable timing circuit, the machine will automatically provide the correct number of cutting strokes to completely sever a tire into segments depending upon the size and configuration of the cutter element and the cooperating dies.

Figure 4:
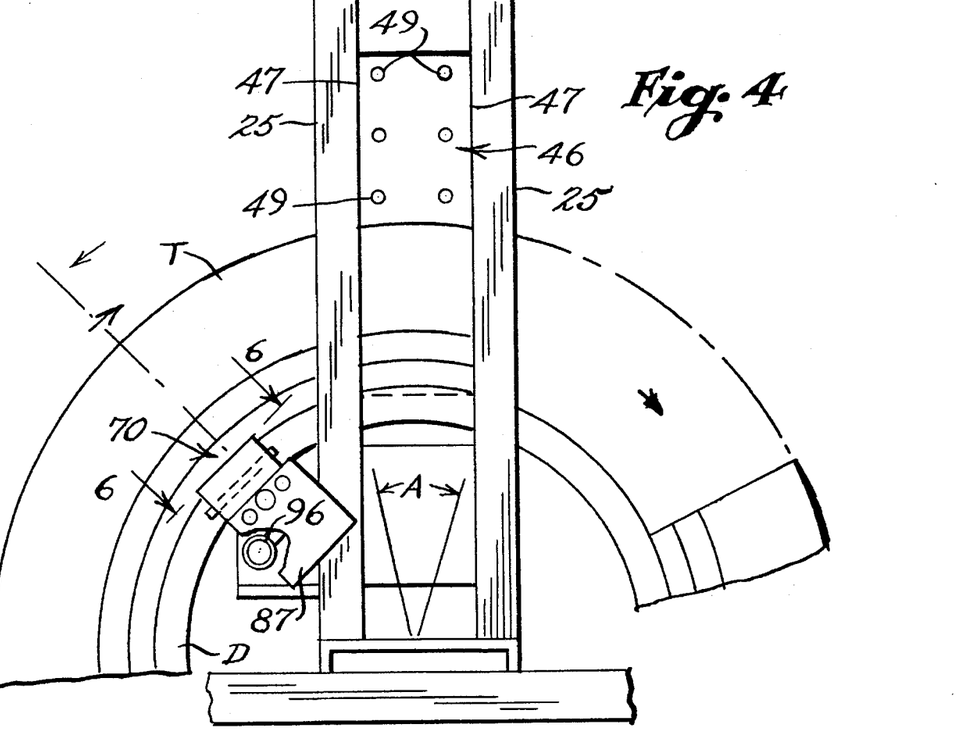
FIG. 4 is an enlarged view taken along the line 4—4 of FIG. 3.
Figure 5:
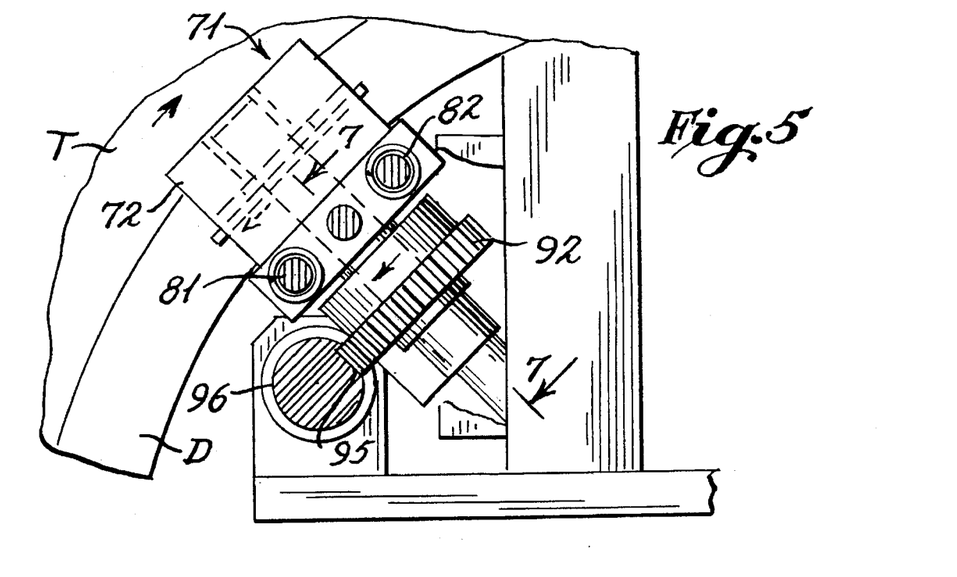
FIG. 5 is an enlarged view having portions broken away taken along line 5—5 of FIG. 3 showing a tire indexing mechanism engaged with the inner reinforced bead of a tire.
Figure 6:
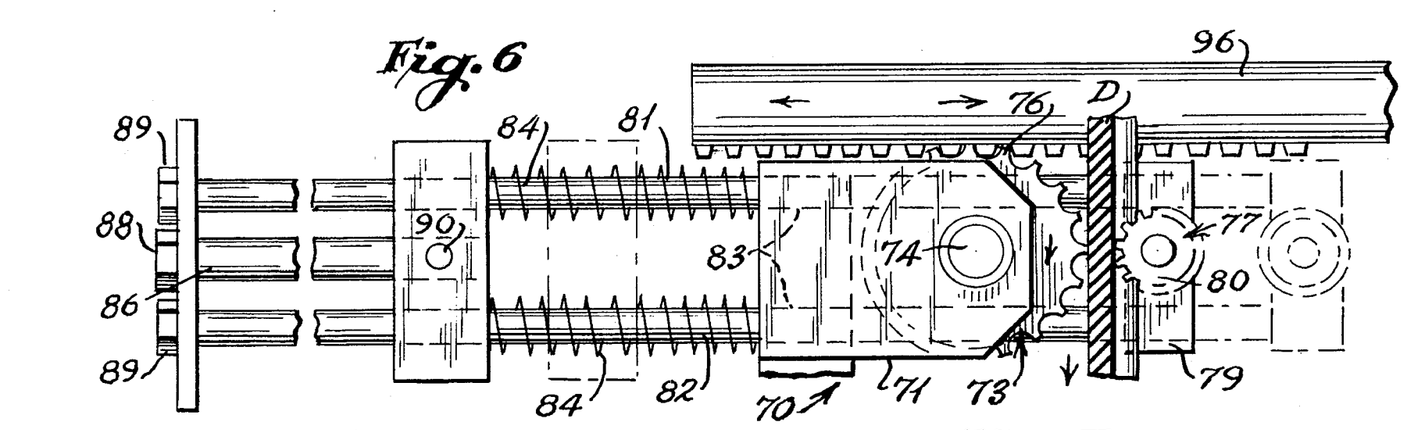
FIG. 6 is an enlarged view taken along line 6—6 of FIG. 4 showing the tire indexing mechanism.
Figure 7:
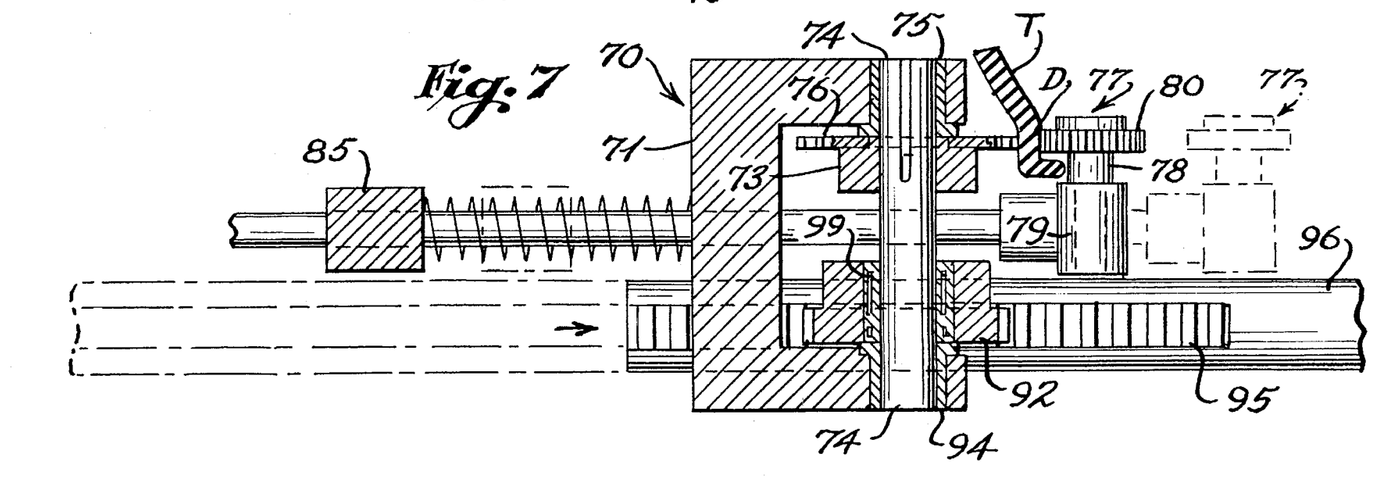
FIG. 7 is an enlarged view taken along line 7—7 of FIG. 5 showing another view of the tire indexing mechanism of the present invention.

To rotate the tire relative to the cutting die 50, the present invention includes an indexing mechanism 70 which is mounted to and extends rearwardly of one of the vertical bracket members 25. The indexing mechanism is designed to engage with the bead portion "D" of a tire "T" and acts to rotate the tire through a predetermined angle "A", as shown in FIG. 4, after each cutting movement of the cutter assembly with respect to the cutting die so that a new section of tire is presented at the opening of the die for the subsequent cutting cycle of the cutter assembly.

With specific reference to FIGS. 4–7, 12 and 14 the indexing mechanism will be described in greater detail. The indexing mechanism 70 includes a fixed housing 71 having flanged portions 72 and 72'. A driven tire engaging wheel 73 is keyed on a shaft 74 positioned within a bushing 75 extending through an opening in the upper portion 72 of the housing 71. As shown in the drawing figures, the outer periphery of the driven wheel 73 may be serrated or provided with a plurality of spaced teeth 76 for purposes of engaging the bead portion "D" of the tire "T". The bead portion "D" of the tire is engaged against the driven wheel 73 of the indexing mechanism by a spring loaded idler wheel 77 which is freely rotatably mounted by shaft 78 to a shiftable block assembly 79. The outer periphery of the idler wheel 77 may also be provided with a plurality of teeth elements 80.

The support block 79 is carried by at least one or a pair of spaced rods 81 and 82 which extend freely through spaced openings 83 in the housing 71 so as to be slidably with respect thereto. On the side of the housing opposite the indexing wheels, spring elements 84 are mounted about the rods 81 and 82 and are retained in place by an adjustable locking block 85 which is also slidably mounted to the rods 81 and 82. The locking block is selectively mounted to a bolt 86 which is secured to a push plate 87 to which the rods 81 and 82 are also secured by the use of bolts 88 and 89, respectively. A set screw 90 is provided through the locking block so as to engage with bolt 86 after a desired degree of compression is placed on the springs. Once adjusted, if pressure is applied in the direction of the arrow in FIG. 6 against the push plate 87, the idler wheel mounted to the support block 79 is moved to the dotted line position to allow the bead of a tire to be inserted between the driven wheel 73 and the idler wheel 77. Thereafter pressure is released from the push plate and the springs will urge the idler wheel into secure and forceful engagement on the opposite side of the tire bead from the indexing driven wheel 73.

To control the rotation of the driven indexing wheel 73, a drive wheel 92 is mounted to the opposite end of shaft 74 which is seated in a bearing 94 in an opening in the lower portion 72' of housing 71. The drive wheel includes a plurality of teeth which are selectively engageable with a plurality of complementary teeth 95 which are oriented in a linear array along a portion of length of an indexing rod 96. The indexing rod is mounted to a bracket 97 which is bolted or otherwise secured to the slide block 28 so that the indexing rod 96 moves forwardly and rearwardly in the slide block as it is reciprocated under the control of the ram assembly 32. The drive wheel 92 is connected to the shaft 74 by a clutch assembly 99 which is press fitted to the drive wheel. One example of a clutch is a Torrington RCB clutch and bearing assembly. In this manner, when the indexing rod 96 is moved forwardly relative to the drive wheel 92 as the cutter is moved toward the cutting die, the drive wheel 92 is rotated, however, the clutch 99 does not engage to rotate the drive shaft 74 and thus the indexing driven wheel 73 is not rotated. However, when the slide rod 28 is withdrawn in order to disengage the cutter from the cutting die, the drive wheel will mesh with the teeth 95 of the indexing bar 96 which will drive the one way clutch to engage with the drive shaft 74 and thereby rotate the driven wheel 73. Therefore, during each reciprocating cycle of the ram assembly 32, the indexing bar will engage the drive wheel thereby driving the indexing driven wheel 73 to rotate a tire a selected number of degrees relative the cutting die 50.

In order to allow the effective cutting stroke of the cutting head to be regulated for different sizes of tires and depending upon the shape and configuration of the cutters and the cutting dies, the cutting machine of the present invention may also include a regulating means to control the operation of the ram assembly 32. With specific reference to FIG. 14, a switch "SW" is provided having a plurality of contacts which are aligned with light sensors 100 mounted to a control block 101 which is disposed through the platform 23. A light source 102 is mounted to the traveling block 28. By placing the switch "SW" at the desired position, once the light source 102 is aligned with the selected sensor, the valve to the ram assembly will be controlled to regulate the stroke of the ram assembly until a proper number of cutting cycles has been completed at which time the motor is automatically stopped.

As opposed to electrically timing the degree of stroke of the indexing rod, it is also possible to mechanically change the effective stroke of the indexing rod by providing a groove in the indexing rod 96 into which varying lengths of teeth 95 may be inserted to thereby control the rotation of the indexing mechanism.

Figure 12:
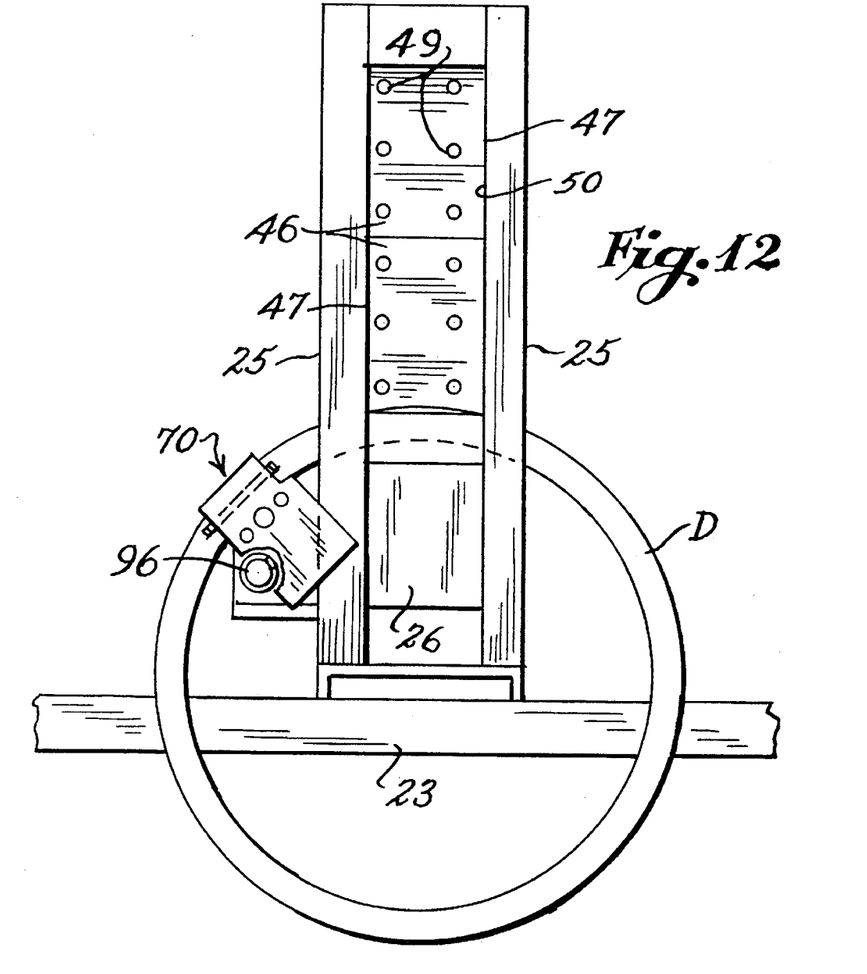
FIG. 12 is a partial front plan view of the cutter die and cutter head showing the remaining bead portion of a tire after the tread and sidewalls have been severed.
Figure 13:
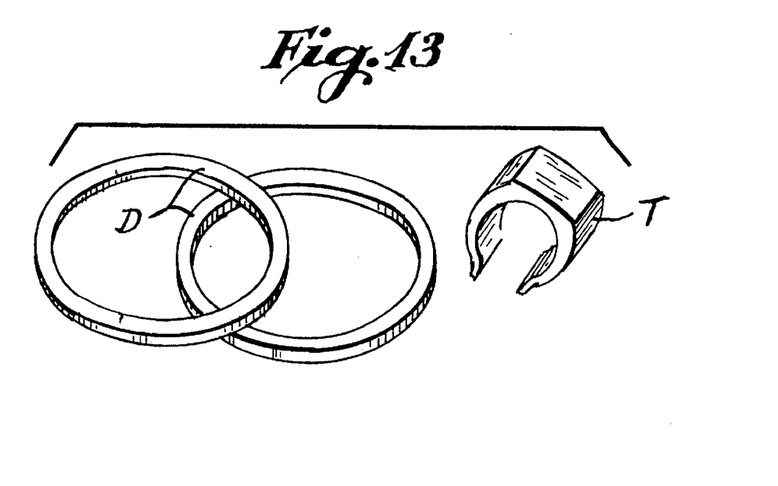
FIG. 13 is an illustrational view of the remaining reinforced beads of a severed tire and an example of a segment of the severed tread and sidewall portions of a tire.

With reference to FIG. 12, after a tire has been indexed through a complete cutting cycle the only portions of the tire on the machine will be the pair of reinforced inner beads which are illustrated in FIG. 13. The remaining portions of the tire will be cut into u-shaped segments such as also shown in FIG. 13. As the control panel will automatically shut-off power to the motor once the cutting cycle has been completed, the operator need not wait by the machine. Once a cutting cycle has been completed, an operator can lift the safety cover 56 and remove the waste beaded tire portions from the machine.

To further stabilize the tire with respect to the die 50, plates 105 may be secured on one or opposite sides of the cantilevered portion 23' of the platform adjacent the forward end of the stand. As shown in FIG. 3, rod elements 106 are welded or otherwise secured to the plates 105 and extend upwardly to engage the sidewall of a tire opposite that of the sidewall engaging the cutting die 50. Also, a secondary guide 107 may be provided along the cantilevered portion 23' of the platform to stabilize the indexing rod 96.

Figure 15:
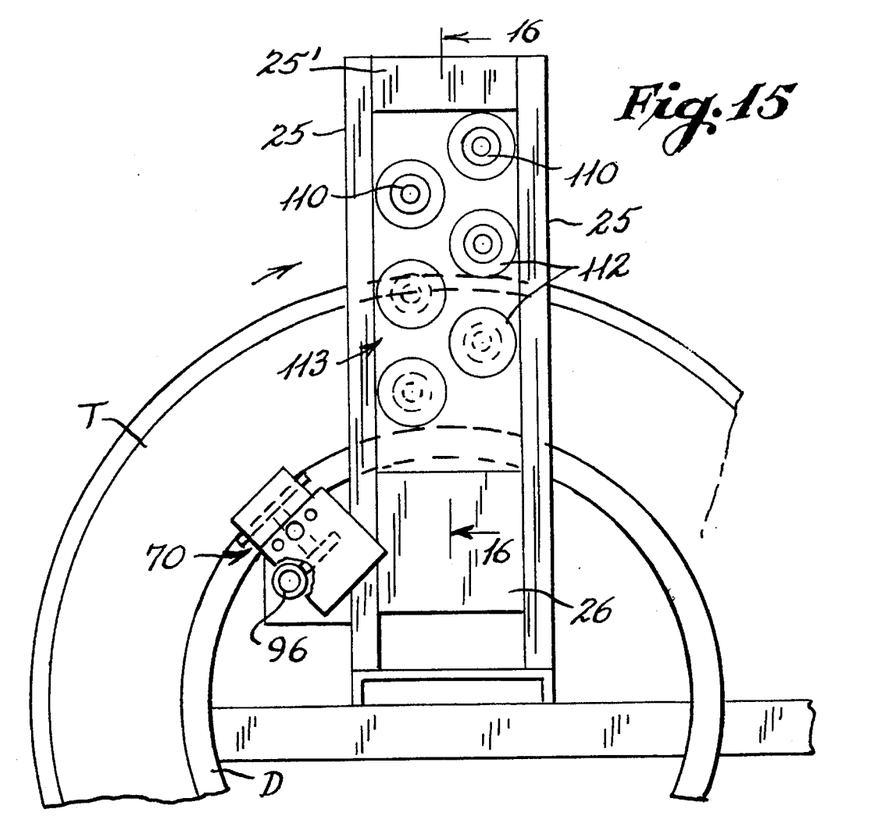
FIG. 15 is a partial front plan view of a second die and punch configuration of the present invention.
Figure 16:
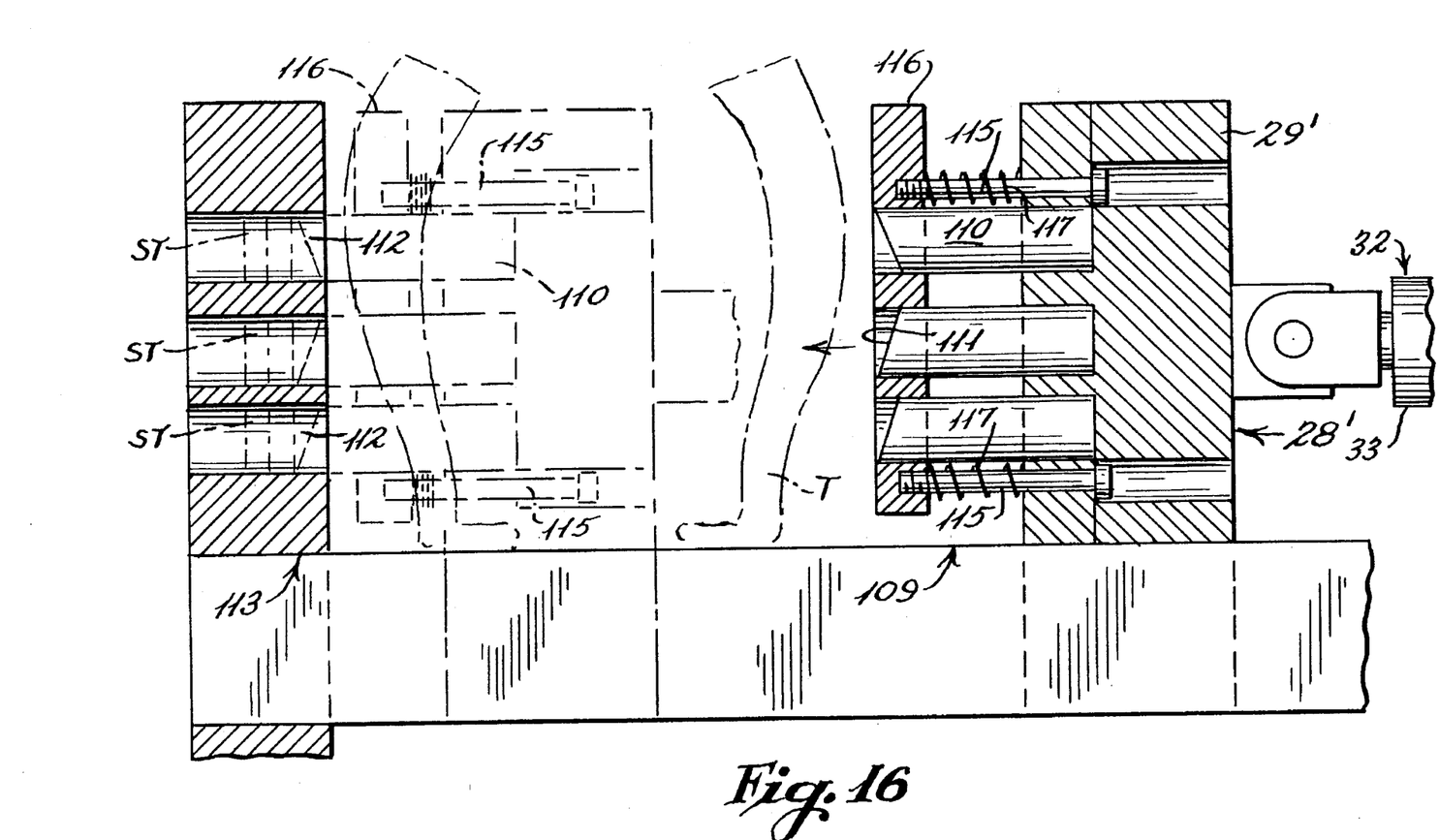
FIG. 16 is an enlarged cross-sectional view of the punch and die configuration shown in FIG. 15.
Figures 17, 18, 19:
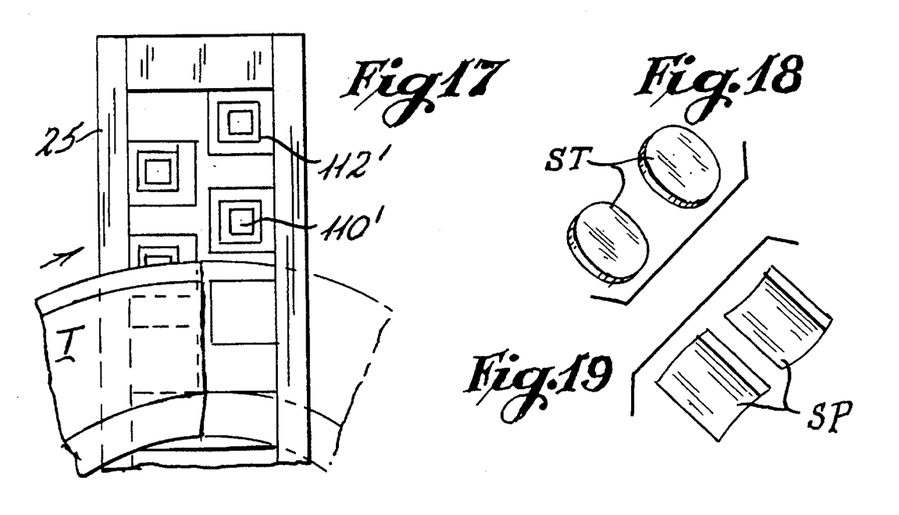
FIG. 17 is a partial front plan view showing two different configurations for punch and dies used in accordance with the teachings of FIGS. 15 and 16.
FIG. 18 shows portions of the sidewall of a tire severed utilizing the punch and die shown in FIG. 15.
FIG. 19 shows portions of a cut sidewall utilizing the square configuration of the punch and die shown in FIG. 17.

With reference to FIGS. 15–17 another embodiment of cutter mechanism is disclosed in greater detail. In this embodiment the cutter assembly is designed to have a plurality of generally circular punches 110 (or square punches 110') having forward bevelled cutting edges 111 which cooperate with a plurality of aligned dies 112 (112') formed in a die block assembly 113 which is receivable between the vertical upright brackets 25 mounted to the end of the platform 23. Each punch 110 (110') is mounted within a block 114 which is bolted to the upstanding portion 29' of a slide block 28' similar to that discussed with respect to the previous embodiment. Bolts 115 extend through the block 114 and into a stripper plate 116 which is mounted in surrounding relationship with respect to the punches 110 (110'). Springs 117 are mounted about the bolts 115 so as to allow the stripper plate 116 to be compressed towards the block 114 to expose the cutting edges 111 of the punch members as the punch engages the die assembly 113. One or any member of punches may be used with a like number of die openings.

With specific reference to FIG. 16, as the punch set 109 moves to the dotted line position shown therein a tire "T" will be compressed between the punch set 109 and the die block 113. The stripper plate will be compressed towards the block 114 as the cutting edges 111 of the punches 110 (110') enter the openings 112 (112') of the dies. The die openings are formed so as to be complimentary to the configurations of the punches 110 (110'). Generally circular (or square) portions of the tire "ST" (SP) are cut during the punching process. The stripper plate 116 is designed to strip any portions of the tire which might otherwise tend to remain engaged to the punch elements 110 (110').

Although not shown in drawing figures, other configurations of punch elements and die openings may be utilized as desired.

I claim:

1. An apparatus for reducing a tire having an inner bead portion and an outer sidewall portion to pieces comprising, a support means, a guide means supported by said support means and having first and second end portions, a slide means mounted relative to said guide means, power means connected to said slide means for reciprocately moving said slide means relative to said guide means, said slide means including a tire severing means extending toward said second end portion of said guide means, a die means mounted adjacent said second end portion of said guide means, indexing means for engaging a tire which has been positioned about said second end portion of said guide means between said severing means and said die means, said severing means having at least one cutting edge which cooperates with said die means for severing a portion of a tire positioned therebetween, and means for activating said indexing means to rotate a tire positioned between said severing means and said die means, said indexing means including a pair of indexing wheel means for cooperatively engaging the bead portion of a tire therebetween, said means for activating said indexing means including drive means for intermittantly rotating at least one of said indexing wheel means when said severing means is spaced from said die means, and means for activating said power means.

2. The apparatus of claim 1 including means for removably mounting said severing means to said slide means.

3. The apparatus of claim 2 in which said die means includes an opening therethrough defined by opposing side edges and at least a lower edge, said severing means having a lower cutting edge and spaced side cutting edges which extend from said lower cutting edge for cooperatively acting with said at least one lower edge and said opposing side edges of said die means for severing a portion of a tire positioned between said die means and said severing means.

4. The apparatus of claim 3 in which each of said side cutting edges of said severing means are generally v-shaped in profile.

5. The apparatus of claim 2 in which said severing means includes at least one punch element having a first cross-sectional configuration, and said die means including at least one opening having a configuration complementary to said first configuration whereby said at least one punch element is cooperatively received within said at least one opening as said slide means is moved towards said die means.

6. The apparatus of claim 5 including a plurality of spaced punch elements, and said die means including a plurality of spaced openings therein which are aligned with said plurality of spaced punch elements.

7. The apparatus of claim 6 including a stripper plate having a plurality of openings therethrough through which said plurality of punch elements extend, and means for resiliently mounting said stripper plate in slidable relationship with respect to said plurality of spaced punch elements.

8. The apparatus of claim 7 in which each of said punch elements includes a forward beveled face.

9. The apparatus of claim 1 including means for resiliently mounting one of said indexing wheel means relative to the other of said indexing wheel means whereby said at least one of said indexing wheel means may be moved apart relative to the other for purposes of receiving the bead portion of a tire therebetween.

10. The apparatus of claim 9 including an indexing housing, means for rotatably mounting said other of said indexing wheel means in said housing, at least one rod member slidably disposed through said indexing housing, a first block mounted to said at least one rod member, said at least one indexing wheel means mounted to said first block in opposing relationship to said other indexing wheel means, a second block mounted to said at least one rod member on an opposite side of said indexing housing from said first block, said at least one rod member extending through said second block, and resilient means mounted between said second block and said indexing housing.

11. The apparatus of claim 10 in which said means for activating said indexing means further includes an indexing rod mounted to said slide means, said indexing rod having an outer end portion extending towards said indexing means, said indexing means including a drive wheel means rotatably engageable with a surface portion of said indexing rod, and means for drivingly connecting said drive wheel means with said other indexing wheel means.

12. The apparatus of claim 11 including a plurality of spaced teeth along said indexing rod, said drive wheel means including a plurality of teeth which are cooperatively meshed with the teeth of said indexing rod, and clutch means disposed between said drive wheel means and said other indexing wheel means for permitting said other indexing wheel means to rotate only as said slide means is moved toward said second end portion of said guide means.

13. The apparatus of claim 12 in which said power means includes a hydraulic cylinder and a piston rod extendable from said cylinder, and means for selectively applying fluid to said hydraulic cylinder to reciprocate said piston therein.

14. The apparatus of claim 13 including means for selectively regulating the length of a stroke of said piston rod with respect to said cylinder to thereby regulate an effective reciprocating movement of said slide means.

15. The apparatus of claim 1 including a housing mounted over said slide means and said die means, said housing including first and second portions, said second portion being pivotably mounted relative said first portion so as to be selectively movable between a closed and an open position to allow a tire to be placed intermediate said slide means and said die means, and switch means mounted to said housing for deactivating said power means when said second portion is not in said closed position with respect to said first portion.

16. An apparatus for reducing a tire having an inner bead portion and a sidewall portion to pieces comprising, a support means, a guide means mounted to said support means and having first and second ends, a cutter means slidably carried by said guide means, a bracket mounted adjacent said second end of said guide means, a die means mounted to said bracket means, ram means mounted to said support means for reciprocally moving said cutter means along said guide means and into cutting relationship with said die means so that a portion of a tire mounted between said cutter means and said die means is severed therebetween, a pair of spaced indexing means for engaging an inner bead portion of a tire therebetween and an indexing rod extending from said cutter means towards said die means and intermittently linearly driving one of said spaced indexing means to rotate a tire relative to said die means whereby successive portions of a tire are positioned between said cutter means and said die means.

17. The apparatus of claim 16 in which said cutter means includes a slide member and at least one cutter element removably mounted to said slide member.

18. The apparatus of claim 17 in which said die means includes at least one opening therein for cooperatively receiving said at least one cutter element therein.

19. The apparatus of claim 16 including a housing mounted over said slide means and said die means, said housing including first and second portions, said second portion being pivotably mounted relative to said first portion so as to be selectively movable between a closed and an open position to allow a tire to be placed intermediate said slide means and said die means, and switch means mounted to said housing for deactivating said power means when said second portion is not in said closed position with respect to said first portion.

\* \* \* \* \*